(12) United States Patent  
Olivier

(10) Patent No.: US 9,317,942 B2  
(45) Date of Patent: Apr. 19, 2016

(54) FAST COMPUTATION OF THE SENSITIVITY MATRIX IN ITERATIVE ALGORITHMS

(75) Inventor: Patrick Olivier, Solon, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 421 days.

(21) Appl. No.: 13/884,976

(22) PCT Filed: Nov. 2, 2011

(86) PCT No.: PCT/IB2011/054862
§ 371 (c)(1),
(2), (4) Date: May 13, 2013

(87) PCT Pub. No.: WO2012/066443
PCT Pub. Date: May 24, 2012

(65) Prior Publication Data
US 2013/0243295 A1    Sep. 19, 2013

Related U.S. Application Data

(60) Provisional application No. 61/413,597, filed on Nov. 15, 2010.

(51) Int. Cl.
*G06K 9/00*    (2006.01)
*G06T 11/00*    (2006.01)
(52) U.S. Cl.
CPC ............. *G06T 11/008* (2013.01); *G06T 11/006* (2013.01)
(58) Field of Classification Search
None
See application file for complete search history.

(56) References Cited

U.S. PATENT DOCUMENTS

| 7,680,240 B2 | 3/2010 | Manjeshwar et al. |
| 7,769,217 B2 | 8/2010 | Hamill |
| 2009/0123048 A1 | 5/2009 | Leroux et al. |
| 2011/0135179 A1* | 6/2011 | Ross ................. A61B 6/037 382/131 |

FOREIGN PATENT DOCUMENTS

| EP | 1729261 A1 | 12/2006 |
| WO | 2007100954 A2 | 9/2007 |

OTHER PUBLICATIONS

Qi, et al. "Propagation of Errors From the Sensitivity Image in List Mode Reconstruction", IEEE Trans. on Medical Imaging, V. 23, No. 9, Sep. 2004, pp. 1094-1099.

Qi, "Calculation of the Sensitivity Image in List-Mode Reconstruction", 2005 IEEE Nuclear Science Symposium Conference Record, pp. 1924-1928.

Rahmim, et al. "Statistical List-Mode Image Reconstruction for the High Resolution Research Tomograph", Phys. Med. Biol. 49 (2004) 4239-4258.

Motta, et al. "Fast 3D-EM Reconstruction Using Planograms for Stationary Planar Positron Emission Mammography Camera", Computerized Medical Imaging and Graphics 29 (2005) pp. 587-596.

(Continued)

*Primary Examiner* — Vikkram Bali

(57) ABSTRACT

An image processing apparatus includes a geometric correction memory which stores a pre-calculated geometric matrix specific to an imaging apparatus. An attenuation map memory which stores an attenuation map of a subject to be imaged in the imaging apparatus. A buffer stores a plurality of lines generated by the imaging apparatus to be reconstructed. A processor reconstructs the lines into a attenuation corrected image representation of the subject using the lines from the buffer, the attenuation map, and the geometric matrix.

16 Claims, 2 Drawing Sheets

(56) References Cited

OTHER PUBLICATIONS

Johnson, et al. "A System for the 3D Reconstruction of Retracted-Septa PET Data Using the Em Algorithm", Nuclear Science Symposium and Medical Imaging Conference, 1994, pp. 1325-1329, V. 3, ISBN: 0-7803-2544-3.

Stayman, J. W., et al.; Efficient Calculation of Resolution and Covariance for Penalized-Likelihood Reconstruction in Fully 3-D SPECT; 2004; IEEE Trans. on Medical Imaging; 23(12)1543-1556.

Stayman, J. W., et al.; Fast Methods for Approximation of Resolution and Covariance for SPECT; 2002; IEEE Trans. on Medical Imaging; 2:786-788.

Ay, M. R., et al.; Computed Tomography Based Attenuation Correction in PET/CT: Principles, Instrumentation, Protocols, Artifacts and Future Trends; 2007; Iranian Journal of Nuclear Medicine; 15(2)1-29.

Ortuno, J. E., et al.; 3D-OSEM iterative image reconstruction for high-resolution PET using precalculated system matrix; 2006; Nuclear Instruments and Methods in Physics Research; A569:440-444.

* cited by examiner

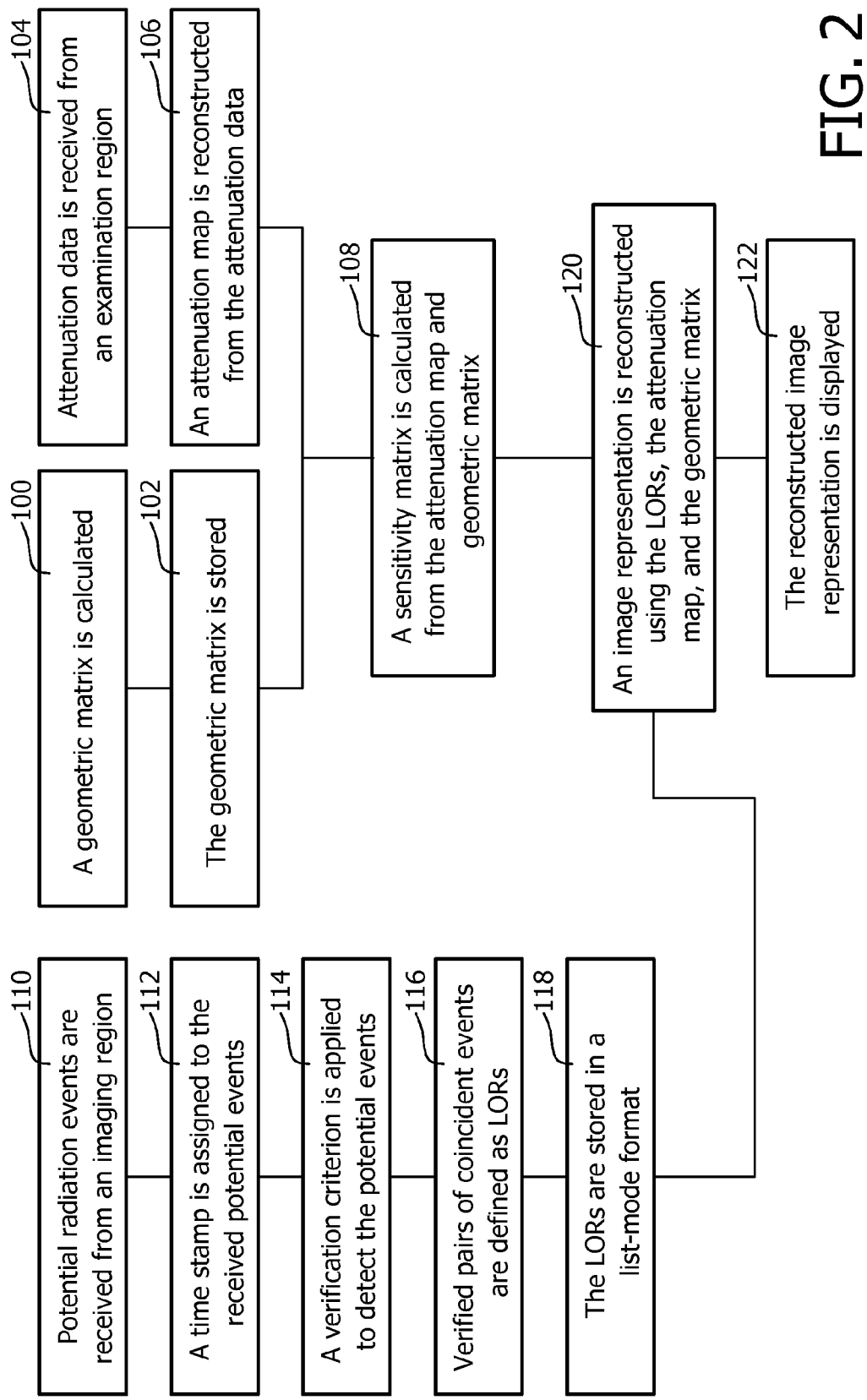

FAST COMPUTATION OF THE SENSITIVITY MATRIX IN ITERATIVE ALGORITHMS

CROSS REFERENCE TO RELATED APPLICATIONS

This application is a national filing of PCT application Serial No. PCT/IB2011/054862, filed Nov. 2, 2011, published as WO 2012/066443 A1 on May 24, 2012, which claims the benefit of U.S. provisional application Ser. No. 61/413,597 filed Nov. 15, 2010, which is incorporated herein by reference.

The present application relates to the diagnostic imaging arts. It finds particular application in accelerating computation of a sensitivity matrix in a nuclear medicine scanner, and will be described with particular reference thereto. It is to be understood, however, that it also finds application in other devices, and is not necessarily limited to the aforementioned application.

Nuclear imaging devices, e.g. positron emission tomography (PET) scanners, reconstruct images from lines of response (LORs). An image value for a first voxel is generated by summing a contribution of each LOR which intersects the voxel. Each interesting LOR is adjusted or weighted based on a sensitivity matrix which indicates the contribution of each voxel intersected by each contributing LOR and the relative sensitivity of the detector pair that defines each LOR. This same calculation is carried over for all voxels of the reconstructed image.

Presently, computation of the sensitivity matrix is an intensive process requiring a back projection of all possible LORs to determine which voxels are intersected by each LOR along with the appropriate attenuation. Since the sensitivity is dependent on the object attenuation, the sensitivity matrix must be computed for each study. The number of calculations further increases as the number of voxels in the reconstructed image increase. The increased number of calculations for higher resolution images results in the addition of a significant amount of time and cost to compute the sensitivity matrix and reconstruct images.

The present application provides an image value computation method and apparatus which overcomes the above-referenced problems and others.

In accordance with one aspect, an image processing apparatus is provided. A geometric correction memory stores a pre-calculated geometric matrix specific to an imaging apparatus. An attenuation map memory stores an attenuation map of a subject to be imaged in the imaging apparatus. A buffer stores a plurality of lines generated by the imaging apparatus to be reconstructed. A processor reconstructs the lines into an attenuation corrected image representation of the subject using the lines from the buffer, the attenuation map, and the geometric matrix.

In accordance with another aspect, a method of image processing is provided. A pre-calculated geometric matrix specific to an imaging apparatus is stored. An attenuation map of a subject to be imaged in the imaging apparatus is stored. Pluralities of lines generated by the imaging apparatus to be reconstructed are stored. An attenuation corrected image representation of the subject is reconstructed using the lines from the buffer, the attenuation map, and the geometric matrix.

In accordance with another aspect, a computer readable memory is provided. The computer readable memory stores a geometric matrix $g_{ii'}$ calculated prior to an imaging procedure according to a formula:

$$g_{ii'} = \left( \sum_{j=1}^{J} h_{ji} h_{ji'} \right)$$

wherein j is one of a plurality of LORs and $h_{ji}$ is a geometric factor estimating how the LOR j is contributing to voxel i.

One advantage resides in quicker computation of the sensitivity matrix values.

Another advantage resides in the utilization of a pre-stored lookup table (LUT) to expedite computation of the sensitivity matrix values.

Another advantage resides in quicker image reconstruction.

Another advantage resides in improved subject throughput.

Another advantage resides in decoupling the attenuation map from the geometry of a PET or other nuclear scanner, CT scanner, or the like.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

FIG. 2 is a flowchart illustration of a method of image processing in accordance with the present application.

Figure 1:
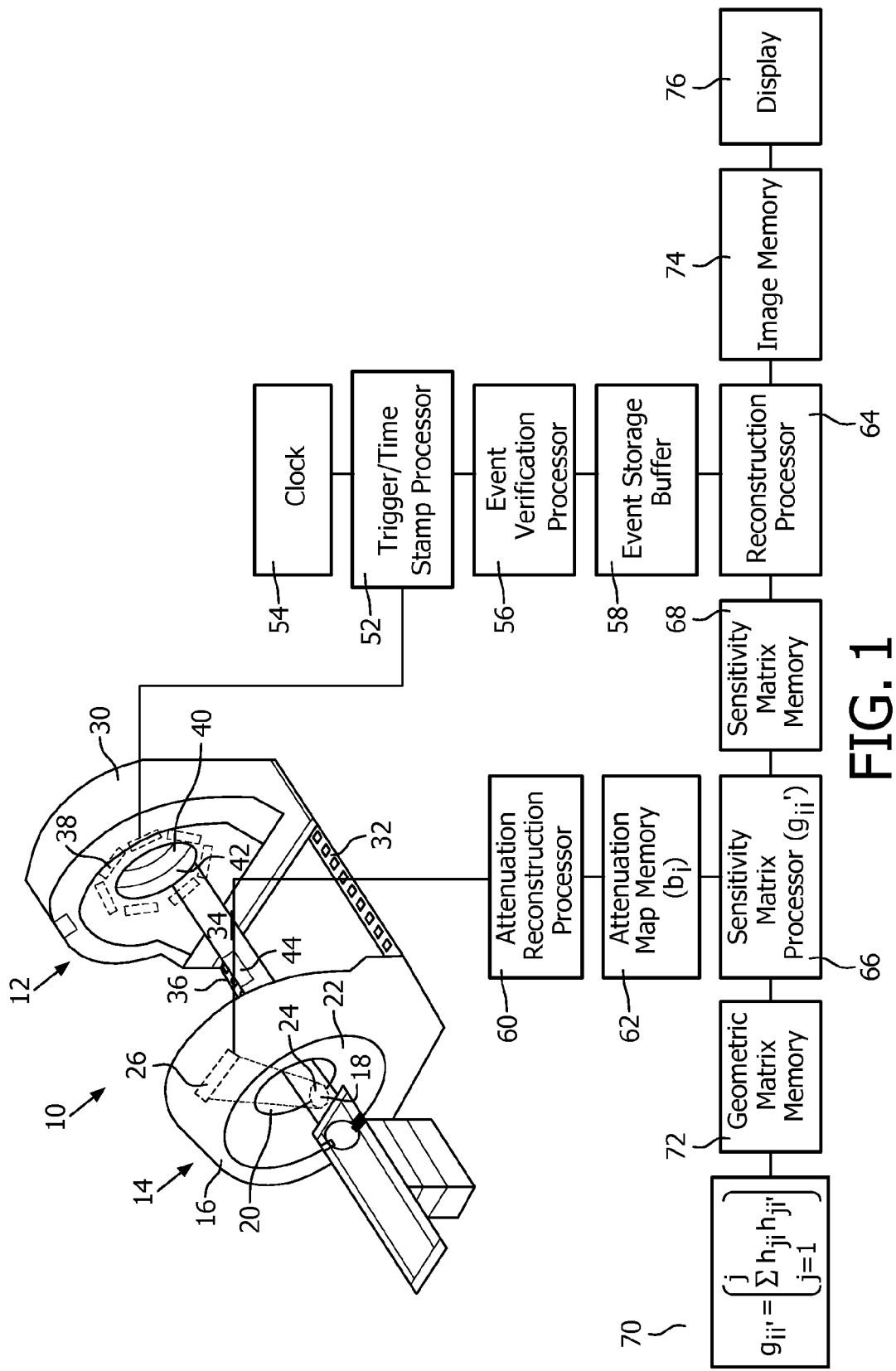
FIG. 1 is a diagrammatic illustration of an imaging system in accordance with the present application.

With reference to FIG. 1, a multi-modality system 10 includes a first imaging system, e.g. a functional modality, preferably, a nuclear imaging system 12, and a second imaging system, e.g. an anatomical modality, such as a computed tomography (CT) scanner 14. The CT scanner 14 includes a non-rotating gantry 16. An x-ray tube 18 is mounted to a rotating gantry 20. A bore 22 defines an examination region 24 of the CT scanner 14. An array of radiation detectors 26 is disposed on the rotating gantry 20 to receive radiation from the x-ray tube 18 after the x-rays transverse the examination region 24. Alternatively, the array of detectors 26 may be positioned on the non-rotating gantry 16. Of course, magnetic resonance and other imaging modalities are also contemplated.

The functional or nuclear imaging system 12, in the illustrated embodiment, includes a positron emission tomography (PET) scanner 30 which may mounted on tracks 32 to facilitate patient access. Of course, SPECT, CT, nuclear medicine imaging, and other imaging modalities are also contemplated. The tracks 32 extend in parallel to a longitudinal axis of a subject support or couch 34, thus enabling the CT scanner 14 and PET scanner 12 to form a closed system. A motor and drive 36, is provided to move the PET scanner 12 in and out of the closed position. Detectors 38 are arranged around a bore 40 which defines an examination region 42. In the illustrated PET system, the detectors 38 are arranged in a stationery ring, although rotatable heads are also contemplated. In the SPECT system, the detectors 38 are typically incorporated into individual heads, which are mounted for rotational and radial movement relative to the patient. A motor and drive 44 or the like, provides a longitudinal movement and vertical adjustment of the subject support 34 in the examination regions 24, 42. Mounted CT and PET systems in a single, shared close system with a common examination region is also contemplated.

With continued reference to FIG. 1, the subject support 34, which carries a subject, is moved into the examination region 24 of the CT scanner 14. The CT scanner 14 generates radiation attenuated data which is then used by an attenuation reconstruction processor 60 to reconstruct the radiation attenuated data into an attenuation map that is stored in an attenuation map memory 62.

The patient support 34 moves the subject into the PET scanner 12 in a position that is geometrically and mechanically predicated as being the same as the imaged position in the CT imaging region 24. Before the PET scan commences, a subject is injected with a radiopharmaceutical. In PET scanning, a pair of gamma rays is produced by a positron annihilation event in the examination region 42 and travel in opposite directions. When the gamma ray strikes the detectors 38, the location of the struck detector element and the strike time are recorded. A triggering processor 52 monitors each detector 38 for an energy spike, e.g., integrated area under the pulse, characteristic of the energy of the gamma rays generated by the radiopharmaceutical. The triggering processor 52 checks a clock 54 and stamps each detected gamma ray with a time of leading edge receipt stamp. In PET imaging, the time stamp, energy estimate and detector position estimation are first used by an event verification processor 56 to determine whether there is a coincident event. Accepted pairs of coincident events define lines of response (LORs). Once an event pair is verified by the event verification processor 56, the LOR is passed to an event storage buffer 58 with their time stamps are stored in the event storage buffer 58 as event data.

A reconstruction processor 64 reconstructs the LORs into an image representation of the subject. In one embodiment, a list-mode reconstruction algorithm is used. The reconstruction processor 64 reconstructs the image representation from the LORs by generating an image value for each voxel including the contribution of each LOR which intersects the voxel. The voxel can have a shape of a rectangular prism, e.g. a cube, a blob, or the like. The list-mode reconstruction algorithm includes a sensitivity matrix which adjusts or weighs the contribution of each LOR intersecting each voxel. The sensitivity matrix is the summation over all possible LORs of the product of a geometrical factor and an attenuation coefficient for all possible voxels. The possible LORs are defined by the geometry of the scanner. In a PET scanner, a plurality of discrete detectors are disposed at fixed locations around the examination region to define discrete geometric points at which an LOR can terminate.

Values of the sensitivity matrix are calculated by a sensitivity map calculation unit or processor 66 and stored in a sensitivity matrix memory 68 or passed directly to the reconstruction processor 64. The sensitivity matrix is calculated using a pre-calculated relationship, in the form of a geometric matrix $g_{ii'}$, between a pair of voxels i and i' and all of the LORs. The geometric matrix $g_{ii'}$ indicates the weight at the voxel i to be given to the attenuation value of each voxel i'. When the scanner is manufactured or calibrated a processor 70 calculates the geometric matrix $g_{ii'}$ and loads it in a look-up table (LUT) or other suitable memory 72 or into the reconstruction processor 64. In one embodiment, the geometric matrix is calculated for a line or model of scanners prior to manufacture of the scanners. The geometric matrix $g_{ii'}$ is pre-calculated and stored in the geometric matrix memory 72 or LUT during the manufacturing process of a given scanner or family of scanners and is not calculated for each patient or study.

In one embodiment, the reconstruction processor 64 accesses the sensitivity matrix from the sensitivity matrix memory 68 when reconstructing an image representation using the list-mode reconstruction algorithm. In another embodiment, the reconstruction processor 64 accesses the attenuation map and the geometric relationship matrix and calculates sensitivity matrix values on the fly. The reconstructed image is stored in an image memory 74 and displayed for a user on a display device 76, printed, saved for later use, and the like.

The triggering processor 52, event verification processor 56, attenuation reconstruction processor 60, reconstruction processor 64, the geometric matrix generating processor 70 and the sensitivity matrix processor 66 include a processor, for example a microprocessor or other software controlled device configured to execute image reconstruction software for performing the operations described in further detail below. Typically, the image reconstruction software is carried on tangible memory or a computer readable medium for execution by the processor. Types of computer readable media include memory such as a hard disk drive, CD-ROM, DVD-ROM and the like. Other implementations of the processor are also contemplated. Display controllers, Application Specific Integrated Circuits (ASICs), FPGAs, and microcontrollers are illustrative examples of other types of component which may be implemented to provide functions of the processor. Embodiments may be implemented using software for execution by a processor, hardware, or some combination thereof.

In one embodiment, the event data is collected in a list-mode format. Recording the relevant properties (detector coordinates, time stamp, etc.) of each detected event in a list has become a common practice in emission tomography applications and has become known as list-mode data acquisition and storage. To transform the detected events into reconstructed images, the reconstruction processor 64 utilizes a list-mode expectation maximization algorithm. The list-mode expectation maximization algorithm can be described by the following iterative reconstruction formula respectively.

$$\lambda_i^{m+1} = \lambda_i^m \frac{\sum_{j=1}^{J}\left(h_{ji} / \sum_{i'=1}^{I} h_{ji'} \lambda_{i'}^m\right)}{\sum_{j=1}^{J} h_{ji} \eta_j^{atten}} \quad (1)$$

wherein $\lambda_i^m$ is the image value (e.g. number of emitted events) at voxel i on the $m^{th}$ iteration, $\lambda_i^{m+1}$ is the image value at voxel i on the $m^{th}+1$ iteration, $$\sum_{j=1}^{J}\left(h_{ji} / \sum_{i'=1}^{I} h_{ji'} \lambda_{i'}^m\right)$$

is the iterative reconstruction algorithm, and $$\sum_{j=1}^{J} h_{ji} \eta_j^{atten}$$

is the sensitivity matrix value $s_i$ at voxel i.

The reconstruction processor 64 uses the list-mode expectation maximization algorithm to calculate an initial value of the image at voxel i on the $m^{th}$ iteration. The list-mode expectation maximization algorithm utilizes this initial image value $\lambda_i^m$ at voxel i on the $m^{th}$ iteration to calculate the image value $\lambda_i^{m+1}$ at voxel i on the $m^{th}+1$ iteration using the iterative reconstruction algorithm and the sensitivity matrix. The iterative reconstruction algorithm of the list-mode expectation maximization algorithm contains the summation over all possible LORs J of the expression $$\left( h_{ji} \bigg/ \sum_{i'=1}^{I} h_{ji'} \lambda_{i'}^m \right).$$

The sensitivity matrix can also adjust for a point spread function indicator of a resolution along each ray: $h_{ij}$ is compensating for the probability of an emission from voxel i being detected by an LOR j not necessarily intersecting the voxel i. The sensitivity matrix at each voxel i is the summation over all possible LORs J of the product of the geometrical factor $h_{ji}$ and the attenuation factor $\eta_j^{atten}$. The sensitivity matrix can be described by the following formula $$s_i = \sum_{j=1}^{J} h_{ji} \eta_j^{atten} \qquad (2)$$

wherein s is the sensitivity matrix, $h_{ji}$ is the geometrical factor, and $\eta_j^{atten}$ is the attenuation factor. The sensitivity matrix s is calculated by loading the attenuation map $b_i$ value for each voxel i. For each LOR, the geometrical factor $h_{ji}$ is derived by tracing ray j along the LOR determining which voxels are intersected and a distance which the LOR traverses through each voxel. The attenuation factor $\eta_j^{atten}$ is then derived by a forward projection of the LOR along the ray j. The sensitivity matrix s is accumulated from a back projection of each LOR to determine which voxels are intersected by each LOR along with the appropriate attenuation.

As previously mentioned, previously to start the list-mode reconstruction process, the sensitivity matrix was pre-calculated. This process required back-projection of all possible LORs for each data frame and was therefore time consuming. Because this process involved all possible LORs, one could take advantage of efficient memory access and scanner symmetry to speed up calculation of the sensitivity matrix. However, the calculation of the sensitivity matrix using this process still could not meet the reconstruction time requirements for high resolution images in clinical use. The sensitivity matrix calculation depends on the attenuation map and cannot be decoupled from it. Furthermore, this calculation depends on the physical model describing the voxel and the LOR interaction. In the prior implementation, the ray tracing of any LOR within a voxel grid involved the voxels close to the LOR. If the system response is introduced then the number of voxels contributing to the LOR becomes larger thereby further complicating the calculation of the sensitivity matrix.

In one embodiment, the number of calculations is reduced by eliminating the sensitivity matrix's dependency on the number of LORs by decoupling the geometric factor $h_{ji}$ from the sensitivity matrix. In other words, the relationship between a voxel and all of the LORs that intersect it and the appropriate contribution between each pair of voxels is removed from the computation of the sensitivity matrix. To accomplish this, the sensitivity matrix is modified. The formula for the attenuation utilized in the sensitivity matrix is described by the following respectively.

$$\eta_j^{atten} = \sum_{i=1}^{I} h_{ji} b_i = \sum_{i'=1}^{I} h_{ji'} b_{i'} \qquad (3)$$

wherein the attenuation index for a first voxel i is the same for a second voxel i'. The attenuation index is the product of the attenuation map $b_i$ and the geometrical factor $h_{ji}$. Thus, iterative reconstruction formula (1) is:

$$\lambda_i^{m+1} = \lambda_i^m \frac{\sum_{j=1}^{J} \left( h_{ji} \bigg/ \sum_{i'=1}^{I} h_{ji'} \lambda_{i'}^m \right)}{\sum_{j=1}^{J} h_{ji} \left( \sum_{i'=1}^{I} h_{ji'} b_{i'} \right)}.$$

Merging the attenuation formula with the sensitivity formula results in sensitivity matrix being described as $$s_i = \sum_{j=1}^{J} h_{ji} \sum_{i'=1}^{I} h_{ji'} b_{i'}.$$

The calculation of the modified sensitivity matrix $$s_i = \sum_{j=1}^{J} h_{ji} \left( \sum_{i'=1}^{I} h_{ji'} b_{i'} \right)$$

in the above iterative reconstruction formula is very computationally intensive and results in the addition of a significant amount of time to compute the sensitivity matrix. To accelerate the computation of the sensitivity matrix, a geometric matrix $g_{ii'}$ is decoupled from the attenuation factor in the sensitivity matrix resulting in the sensitivity matrix being described by the following formula respectively.

$$s_i = \sum_{i'=1}^{I} b_{i'} \left( \sum_{j=1}^{J} h_{ji} h_{ji'} \right), \qquad (4)$$

wherein $$\sum_{j=1}^{J} h_{ji} h_{ji'}$$

is the geometric matrix $g_{ii'}$. Decoupling the geometric matrix enables the sensitivity matrix to be calculated using a pre-calculated geometric matrix. The pre-calculated geometric matrix can be calculated for a given scanner or a family of scanners and stored in a look-up table or other suitable memory and is independent of the subject being imaged. In this manner, the attenuation map is decoupled from the geometry of the scanner. As mentioned above, the geometric matrix is pre-calculated and stored in the geometric matrix memory during the manufacturing process of a given scanner or family of scanners and is not calculated for each patient or study.

This modification enables the geometric matrix $$g_{ii'} = \left(\sum_{j=1}^{J} h_{ji} h_{ji'}\right)$$

to be pre-calculated before the calculation of the sensitivity matrix. The modification also allows the geometric matrix to be calculated before clinical use of the scanner. For example, the sensitivity matrix for a given scanner or family of scanner can be pre-calculated by the manufacturer prior to being utilized in a clinical environment. Calculating the geometric matrix $g_{ii'}$ need only be done once, long before a clinical imaging process. By pre-calculating $$g_{ii'} = \left(\sum_{j=1}^{J} h_{ji} h_{ji'}\right)$$

the number of calculations required during clinical imaging to determine the sensitivity matrix is reduced by avoiding the summation process over all the LORs. For each voxel i, the image $$i' \longrightarrow g_{ii'} = \left(\sum_{j=1}^{J} h_{ji} h_{ji'}\right)$$

is pre-calculated. For any voxel i, the image i' is centered at voxel i and is almost spherically symmetric. Using the profile $f_i$, wherein for each voxel i the image is pre-calculated, the profile can be described by the following formula respectively.

$$f_i(i') = g_{ii'} = \left(\sum_{j=1}^{J} h_{ji} h_{ji'}\right) \quad (5)$$

The sensitivity matrix s is calculated by loading the attenuation map $b_i$ in voxel i. For each voxel i, $b_i$, $f_i(i')$ is evaluated and $$s_i = \sum_{i'=1}^{I} b_{i'} f_i(i')$$

is accumulated over all voxels i'. By pre-calculating the geometric factor, the iterative reconstruction formula (1) becomes $$\lambda_i^{m+1} = \lambda_i^m \frac{\sum_{j=1}^{J}\left(h_{ji} / \sum_{i'=1}^{I} h_{ji'} \lambda_{i'}^m\right)}{\sum_{i'=1}^{I} b_{i'} g_{ii'}}. \quad (6)$$

Replacing the sensitivity matrix $$s_i = \sum_{j=1}^{J} h_{ji}\left(\sum_{i'=1}^{I} h_{ji'} b_{i'}\right) \text{ with } s_i = \sum_{i'=1}^{I} b_{i'} g_{ii'}$$

reduces the computation time of the sensitivity matrix significantly. Specifically, the computation time is decreased by decreasing the number of calculations required to calculate the sensitivity matrix by eliminating the sensitivity matrix's dependency on the number of LORs by decoupling the relationship between a voxel and all of the LORs that intersect it from the calculation.

It is also contemplated that the computation time of the iterative reconstructive formula can be further decreased by pre-calculating a second geometric factor for the iterative reconstructive co-efficient $$\sum_{j=1}^{J}\left(h_{ji} / \sum_{i'=1}^{I} h_{ji'} \lambda_{i'}^m\right).$$

Pre-calculating the geometric factor of the iterative reconstructive co-efficient $$\sum_{j=1}^{J}\left(h_{ji} / \sum_{i'=1}^{I} h_{ji'} \lambda_{i'}^m\right)$$

reduces the number of calculations required to reconstruct the image representation by avoiding the summation process over all the LORs. This pre-calculated second geometric matrix can be calculated for a given scanner or a family of scanners and stored in a look-up table or other suitable memory. As mentioned above, the geometric matrix is pre-calculated and stored in the geometric matrix memory during the manufacturing process of a given scanner or family of scanners and is not calculated for each patient or study.

Pre-calculating the geometric factor of the sensitivity matrix provides the advantage of the sensitivity matrix being calculated once instead of for each frame and for each line and voxel. Additionally, pre-calculating the geometric factor eliminates the need to compute the geometric factor for each subject or study. Further, calculation of the sensitivity matrix can be calculated as soon as the attenuation map is generated, e.g. in preparation of for and during PET data acquisition.

In another embodiment, calculation of the sensitivity matrix can be further accelerated by ignoring the voxels which have little or no effect on the sensitivity matrix of a particular voxel. The sensitivity matrix is determined using the attenuation index of a first voxel and a second voxel. The second voxel includes all possible voxels or neighboring voxels. Additionally, every LOR is affected by the entire volume of voxels around the line and should be accounted for when determining the sensitivity of a voxel. The surrounding voxels that have little or no effect on the sensitivity of a particular voxel can be ignored thereby decreasing the calculation time of the sensitivity matrix. A threshold value can be implemented that indicates that certain voxels that do not significantly contribute to the sensitivity value of voxel being calculated can be ignored. A boundary of negligible voxels can be determined from the threshold and all those voxels outside of the boundary can be ignored when calculating the sensitivity matrix for a certain voxel.

FIG. 2 illustrates a method of image processing. In step 100, the geometric matrix for a given scanner or family of scanners is calculated. The pre-calculated geometric matrix is stored in a step 102. In a step 104, attenuation data is received from an examination region. An attenuation map is reconstructed from the received attenuation data in a step 106. In a step 108, a sensitivity matrix is calculated from the reconstructed attenuation map and the stored geometric matrix. In one embodiment, a sensitivity matrix is calculated for all possible LORs. As mentioned above, the possible LORs are defined by the geometry of the scanner. In another embodiment, the geometric matrix and the attenuation map are addressed on the fly to evaluate each LOR being constructed. In a step 110, potential radiation events are received from an examination region. A time stamp is assigned to the received events in a step 112. In a step 114, a verification criterion is applied to detect the coincident events. In a step 116, verified pairs of coincident events are defined as LORs. In a step 118, the LORs stamped events are stored in a list-mode format. In a step 120, a reconstruction processor reconstructs an image representation of an examination region using the LORs, the attenuation map, and the geometric matrix. The image representation is displayed in a step 122 on a monitor or display device.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A image processing apparatus comprising:
a geometric correction memory which stores a pre-calculated geometric matrix specific to an imaging apparatus;
an attenuation map memory which stores an attenuation map of a subject to be imaged in the imaging apparatus;
a buffer which stores a plurality of lines generated by the imaging apparatus to be reconstructed;
a processor which reconstructs the lines into an attenuation corrected image representation of the subject using the lines from the buffer, the attenuation map, and the geometric matrix; and
wherein the geometric correction memory includes a look-up table storing pre-calculated geometric matrix values which are calculated for the imaging apparatus during manufacture and are not calculated for each patient.

2. The image processing apparatus according to claim 1, wherein the geometric matrix represents a relationship between a first voxel and each of the voxels that all possible lines through the first voxel can intersect.

3. The image processing apparatus according to claim 1, wherein the lines through the first voxel are stored in the buffer in list mode format and the processor reconstructs the image representation using a list-mode reconstruction algorithm.

4. The image processing apparatus according to claim 1, wherein the imaging apparatus is a PET scanner.

5. The imaging processing apparatus according to claim 1, further including:
a display configured to display the attenuation corrected image representation of the subject.

6. The imaging processing apparatus according to claim 1, wherein the processor determines a boundary of negligible voxels that do not significantly contribute to a sensitivity value of a voxel and ignores all voxels outside of the boundary when calculating the sensitivity matrix for a certain voxel.

7. An image processing apparatus comprising:
a geometric correction memory configured to store a pre-calculated geometric matrix specific to an imaging apparatus;
an attenuation map memory configured to store an attenuation map of a subject to be imaged in the imaging apparatus;
a buffer configured to store a plurality of lines generated by the imaging apparatus to be reconstructed in a list mode format; and
a processor configured to reconstruct the lines into an attenuation corrected image representation of the subject using the lines from the buffer, the attenuation map, and the geometric matrix, wherein the processor is configured to reconstruct the image using a reconstruction algorithm represented by $$\lambda_i^{m+1} = \lambda_i^m \frac{\sum_{j=1}^{J} \left( h_{ji} / \sum_{i'=1}^{I} h_{ji'} \lambda_{i'}^m \right)}{\sum_{i'=1}^{I} b_{i'} g_{ii'}}$$

wherein $\lambda_i^m$ is a image value at voxel i on a $m^{th}$ iteration, $\lambda_i^{m+1}$ is the image value at voxel i on a $m^{th+1}$ iteration, $$\sum_{j=1}^{J} \left( h_{ji} / \sum_{i'=1}^{I} h_{ji'} \lambda_{i'}^m \right)$$

is a iterative reconstruction algorithm, and $$\sum_{i'=1}^{I} b_{i'} g_{ii'}$$

is a sensitivity matrix, wherein $g_{ii'}$ is the geometric matrix, $b_{i'}$ is the attenuation map, j is one the lines, and $h_{ji}$ is a geometric factor.

8. The method of image processing comprising:
in one or more memories, storing a pre-calculated geometric matrix specific to an imaging apparatus;
in the one or more memories, storing an attenuation map of a subject imaged in the imaging apparatus;
in the one or more memories, storing a plurality of lines generated by the imaging apparatus to be reconstructed; and
with a processor, reconstructing the lines into an attenuation corrected image representation of the subject using the lines, the attenuation map, and the geometric matrix, wherein the stored pre-calculated geometric matrix values are calculated for the imaging apparatus during manufacture and are not calculated for each patient.

9. The method of image processing according to claim 8, wherein the geometric matrix represents a relationship between a first voxel and each voxel that all possible lines through the first voxel can interest.

10. The method of image processing according to claim 8, wherein the lines are stored in list mode and the image representation is reconstructed using a list-mode reconstruction algorithm.

11. The method of image processing according to claim 10, wherein the processor reconstructs the image using a reconstruction algorithm represented by $$\lambda_i^{m+1} = \lambda_i^m \frac{\sum_{j=1}^{J} \left( h_{ji} \Big/ \sum_{i'=1}^{J} h_{ji'} \lambda_{i'}^m \right)}{\sum_{i'=1}^{I} b_{i'} \lambda_{ii'}}$$

wherein $\lambda_i^m$ us a image value at voxel i on a $m^{th}$ iteration, $\lambda_i^{m+1}$ is the image value at voxel i on a $m^{th+1}$ iteration, $$\sum_{j=1}^{J} \left( h_{ji} \Big/ \sum_{i'=1}^{I} h_{ji'} \lambda_{i'}^m \right)$$

is a iterative reconstruction algorithm, and $$\sum_{i'=1}^{I} b_{i'} g_{ii'}$$

is a sensitivity matrix, wherein $g_{ii'}$ is the geometric matrix, $b_{i'}$ is the attenuation map, j is one of the lines, and $h_{ji}$ is a geometric factor.

12. The method of image processing according to claim 8, wherein the list-mode reconstruction algorithm utilizes a previous image representation value, an iterative reconstruction algorithm, and a sensitivity matrix to reconstruct the image representation.

13. The method of image processing according to claim 12, further including, with the processor:
  determining a boundary of negligible voxels that do not significantly contribute to a sensitivity value of a voxel; and
  ignoring all voxels outside of the boundary when calculating the sensitivity matrix for a certain voxel.

14. The method of image processing according to claim 8, further including:
  displaying the reconstructed image representation on a display device.

15. A non-transitory computer readable medium which carries a computer program which controls one or more processors to perform the method of claim 8.

16. A method of image processing comprising:
  with a processor, receiving a plurality of lines generated by a imaging apparatus to be reconstructed;
  with the processor, reconstructing the lines into an attenuation corrected image representation using the lines, an attenuation map, and a geometric matrix, wherein the attenuation map is decoupled from the geometric matrix;
  wherein the image representation is constructed using a reconstruction algorithm represented by $$\lambda_i^{m+1} = \lambda_i^m \frac{\sum_{j=1}^{J} \left( h_{ji} \Big/ \sum_{i'=1}^{I} h_{ji'} \lambda_{i'}^m \right)}{\sum_{i'=1}^{I} b_{i'} g_{ii'}}$$

wherein $\lambda_i^m$ is a image value at voxel i on a $m^{th}$ iteration, $\lambda_i^{m+1}$ is the image value at voxel i on a $m^{th+1}$ iteration, $$\sum_{j=1}^{J} \left( h_{ji} \Big/ \sum_{i'=1}^{I} h_{ji'} \lambda_{i'}^m \right)$$

is a iterative reconstruction algorithm, and $$\sum_{i'=1}^{I} b_{i'} g_{ii'}$$

is a sensitivity matrix, wherein $g_{ii'}$ is the geometric matrix, $b_{i'}$ is the attenuation map, j is one the lines, and $h_{ji}$ is a geometric factor.

* * * * *